(12) United States Patent
Kim et al.

(10) Patent No.: US 10,339,742 B2
(45) Date of Patent: Jul. 2, 2019

(54) INPUT DEVICE, ELECTRONIC LOCK INCLUDING THE SAME, AND METHOD FOR CONTROLLING THE ELECTRONIC LOCK

(71) Applicants: Hyundai Motor Company, Seoul (KR); Kia Motors Corporation, Seoul (KR); LS Automotive Technologies Co., Ltd., Anyang-si (KR)

(72) Inventors: Hye Kyung Kim, Suwon-si (KR); Sung Sik Choi, Suwon-si (KR); Dae Ig Jung, Suwon-si (KR); Young Ju Lee, Suwon-si (KR); Keon Soo Jin, Ulsan (KR); Dae Wook Kwon, Gunpo-si (KR); Min Seok Kwon, Bucheon-si (KR); Won Lee, Anyang-si (KR); Moon Soo Kim, Ansan-si (KR)

(73) Assignees: Hyundai Motor Company, Seoul (KR); Kia Motors Corporation, Seoul (KR); LS Automotive Technologies Co., Ltd., Anyang-si (KR)

( * ) Notice: Subject to any disclaimer, the term of this patent is extended or adjusted under 35 U.S.C. 154(b) by 0 days.

(21) Appl. No.: 15/691,449

(22) Filed: Aug. 30, 2017

(65) Prior Publication Data

US 2018/0158270 A1 Jun. 7, 2018

(30) Foreign Application Priority Data

Dec. 7, 2016 (KR) .................. 10-2016-0165756

(51) Int. Cl.
*G07C 9/00* (2006.01)
*G06F 3/044* (2006.01)
*G06F 3/0354* (2013.01)

(52) U.S. Cl.
CPC ..... *G07C 9/00714* (2013.01); *G06F 3/03547* (2013.01); *G07C 9/00111* (2013.01);
(Continued)

(58) Field of Classification Search
CPC ............ G07C 9/00142; G07C 9/00912; G07C 9/00714; G07C 9/00111; G07C 9/00182;
(Continued)

(56) References Cited

U.S. PATENT DOCUMENTS 4,479,112 A 10/1984 Hirsch
7,714,265 B2 * 5/2010 Fadell ................... G01J 1/4204
250/214 AL
(Continued)

FOREIGN PATENT DOCUMENTS

KR 20-0295546 Y1 11/2002
KR 10-0888376 B1 3/2009
(Continued)

*Primary Examiner* — Emily C Terrell
(74) *Attorney, Agent, or Firm* — Morgan, Lewis & Bockius LLP

(57) ABSTRACT

An input device includes a touch pad may include a transmissive material, a touch detector disposed at a rear portion of the touch pad, a printed circuit board connected to the touch detector, and a plurality of light emitting devices mounted on the printed circuit board, wherein a plurality of input elements is provided on a back surface of the touch detector. Each input element has at least two symbols that are formed in overlap with each other and in mutually different colors.

9 Claims, 10 Drawing Sheets

(52) U.S. Cl.
CPC ..... *G07C 9/00142* (2013.01); *G07C 9/00182* (2013.01); *G07C 9/00817* (2013.01); *G06F 3/044* (2013.01); *G07C 2009/0019* (2013.01); *G07C 2009/00833* (2013.01); *G07C 2009/00841* (2013.01)

(58) Field of Classification Search
CPC ........ G07C 9/00817; G07C 2009/0019; G07C 2009/00833; G07C 2009/0084; G06F 3/03547; G06F 3/044
USPC .............................. 340/5.54, 5.55, 542, 5.73
See application file for complete search history.

(56) References Cited

U.S. PATENT DOCUMENTS

| | | | |
|---|---|---|---|
| 9,367,151 B2* | 6/2016 | McKillop | G06F 3/03547 |
| 9,448,679 B2* | 9/2016 | Lee | G06F 3/044 |
| 2008/0272927 A1* | 11/2008 | Woolley | G06F 3/041 |
| | | | 340/815.4 |
| 2011/0162420 A1 | 7/2011 | Lee | |
| 2015/0001302 A1* | 1/2015 | Gelay | G06K 7/015 |
| | | | 235/462.2 |
| 2016/0059699 A1* | 3/2016 | Intini | B60K 35/00 |
| | | | 74/552 |

FOREIGN PATENT DOCUMENTS

| KR | 10-2011-0085166 A | 7/2011 |
|---|---|---|
| KR | 10-1594498 B1 | 2/2016 |

\* cited by examiner

INPUT DEVICE, ELECTRONIC LOCK INCLUDING THE SAME, AND METHOD FOR CONTROLLING THE ELECTRONIC LOCK

CROSS-REFERENCE(S) TO RELATED APPLICATIONS

The present application claims priority to Korean Patent Application No. 10-2016-0165756, filed on Dec. 7, 2016, the entire contents of which is incorporated herein for all purposes by this reference.

BACKGROUND OF THE INVENTION

Field of the Invention

The present invention relates to an input device and more particularly, to an input device which is capable of enhancing security and privacy by varying the positions of symbols, an electronic lock including the same, and a method for controlling the electronic lock.

Description of Related Art

In general, electronic locks have been employed in home doors, office doors, and storage box doors to enhance the security of the doors.

An input device is connected to the electronic lock. The input device has a plurality of input keys on which a plurality of symbols are displayed. The locking or the unlocking of the electronic lock may be controlled by inputting a password through the input keys.

However, in an input device of a conventional electronic lock, symbols (numbers, characters, and the like) are designated to and displayed on relevant input keys. Accordingly, when a fingerprint and the like remain on each input key, the security may be threatened.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an input device which is configured for enhancing security and privacy by varying the positions of symbols of input elements, an electronic lock including the same, and a method for controlling the electronic lock.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an input device may include:

a touch pad including a transmissive material; a touch detector disposed at a rear portion of the touch pad; a printed circuit board connected to the touch detector; and a plurality of light emitting devices mounted on the printed circuit board.

A plurality of input elements may be provided on a back surface of the touch detector. Each input element may have at least two symbols that are formed in overlap with each other and in mutually different colors. The light emitting devices may be disposed to individually emit light to the input elements.

Each light emitting device may be configured to emit lights having at least two different colors corresponding to mutually different colors of symbols of each input element.

The input elements may be formed on a film, and the film may be attached to the back surface of the touch pad.

The input elements may be printed on the back surface of the touch pad.

The touch detector may include a capacitive detector having a plurality of electrodes.

The electrodes may include transparent materials.

The touch detector may be printed together with the input elements on the back surface of the touch pad.

A support member may be interposed between the touch detector and the printed circuit board. The support member may have a plurality of receiving openings in which the light emitting devices are received.

The receiving openings may be isolated from each other by a sealing wall.

According to various aspects of the present invention, an electronic lock may include: an input device, which includes a touch pad, a touch detector disposed at a rear portion of the touch pad, a printed circuit board connected to the touch detector, and a plurality of light emitting devices mounted on the printed circuit board, a radio frequency antenna mounted on the printed circuit board, and a plurality of input elements and a verification element provided on a back surface of the touch detector; a locking mechanism connected to the input device; a control device which controls the locking mechanism; a touch authentication module connected to the touch sensor; and a wireless authentication module connected to the radio frequency antenna.

According to various aspects of the present invention, a method for controlling the electronic lock may include:

proceeding to a sleep mode in which a plurality of light emitting devices are turned off when a touch to a touch pad is not input even though a predetermined standby time, or more, elapses; determining whether a symbol of at least one input element is touched after the touch to the touch pad is input within the predetermined standby time; determining whether a present mode is a password authentication mode when the symbol of the at least one input element is touched; and inputting a password when the present mode is the password authentication mode and performing an unlocking operation of a locking mechanism when the input password is matched with a registered password.

The method may further include: determining whether the present mode is a wireless authentication mode by a radio frequency antenna and an electronic tag when the symbol of the at least one input element is not touched; and performing the unlocking operation of the locking mechanism when the present mode is the wireless authentication mode and when input identification information of the electronic tag is matched with registered identification information.

The method may further include: determining whether a user registration mode is performed when the present mode is not the wireless authentication mode, the user registration mode being a mode in which the password or identification information of the electronic tag is registered by a user; and inputting the password or the identification information of the electronic tag when the user registration mode is determined to be performed.

The method may further include: determining whether a supervisor registration mode is performed when the user registration mode is not determined to be performed, the supervisor registration mode being a mode in which the password is registered by a supervisor; and inputting the password when the supervisor registration mode is determined to be performed.

The method sand apparatuses of the present invention have other features and advantages which will be apparent from or are set forth in more detail in the accompanying drawings, which are incorporated herein, and the following Detailed Description, which together serve to explain certain principles of the present invention.

Figure 1:
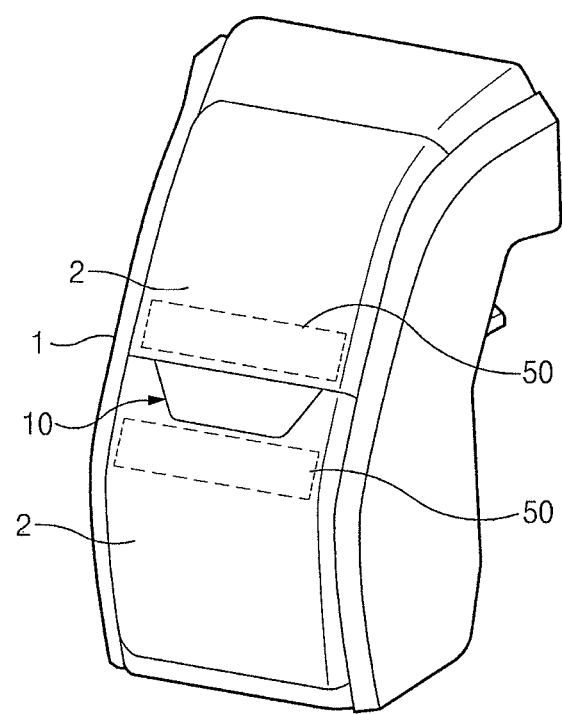
FIG. 1 is a view illustrating an input device and an electronic lock applied to a receiving box, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment, In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to accompanying drawings. The size of each element and the thickness of a line, which are illustrated in the accompanying drawings, may be exaggerated for convenience or clarity, and do not reflect an actual size. In addition, the terms employed for the description of the present invention are defined based on functions of relevant elements in an exemplary embodiment of the present invention. Accordingly, the terms may be varied with the intent and the custom of a user and a supervisor. The terms are defined based on the inventive concept throughout the whole specification.

FIG. 1 is a view illustrating the state that an input device 10 and an electronic lock 100 including the input device 10 are disposed in a receiving box 1, according to an exemplary embodiment of the present invention.

Figure 2:
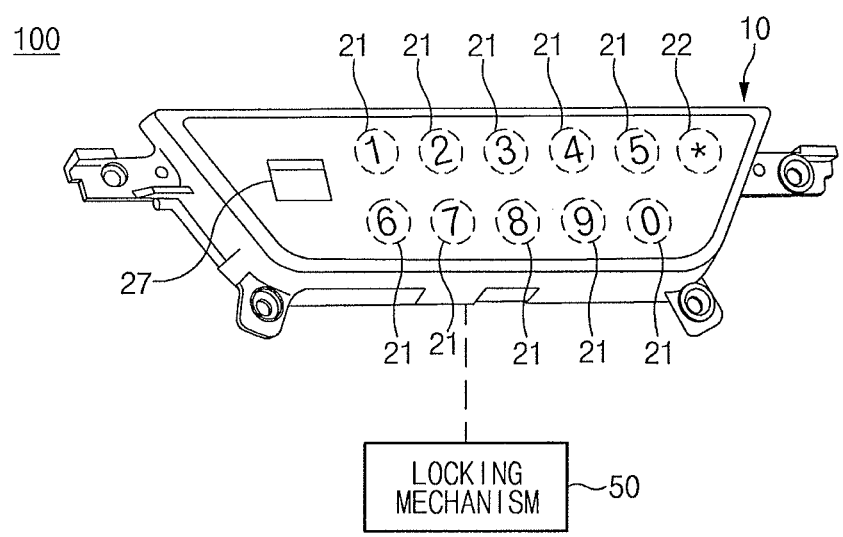
FIG. 2 is a front perspective view illustrating the input device, according to an exemplary embodiment of the present invention.
Figure 3:
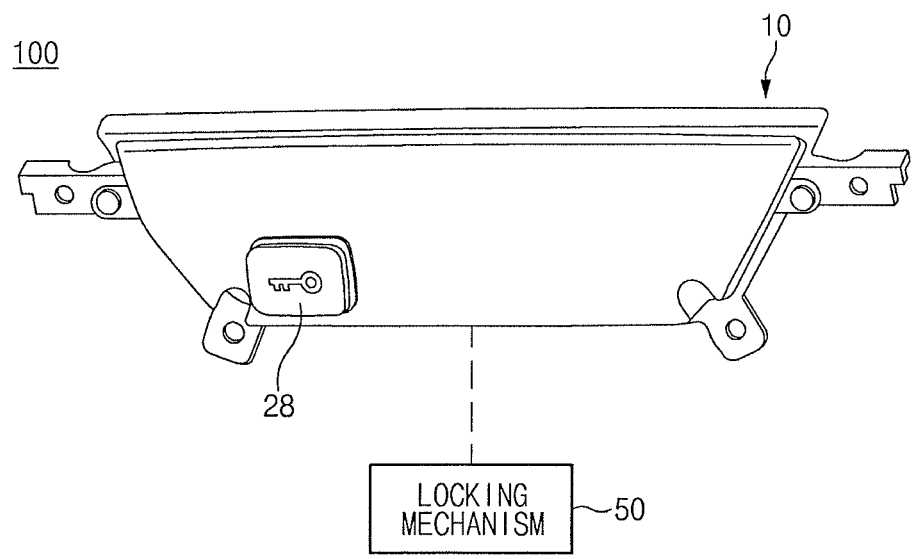
FIG. 3 is a rear perspective view illustrating the input device, according to an exemplary embodiment of the present invention.
Figure 4:
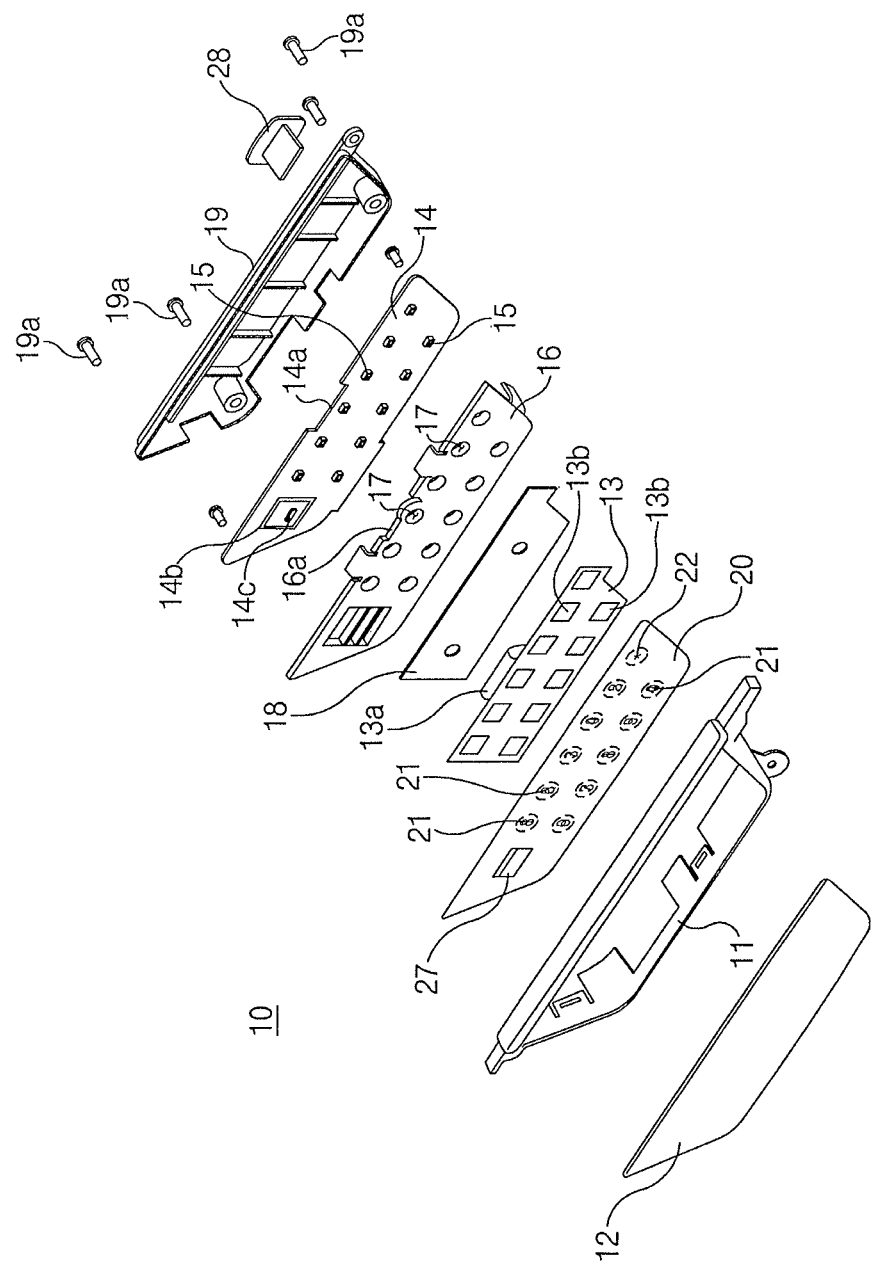
FIG. 4 is an exploded perspective view illustrating the input device, according to an exemplary embodiment of the present invention.
Figure 5:
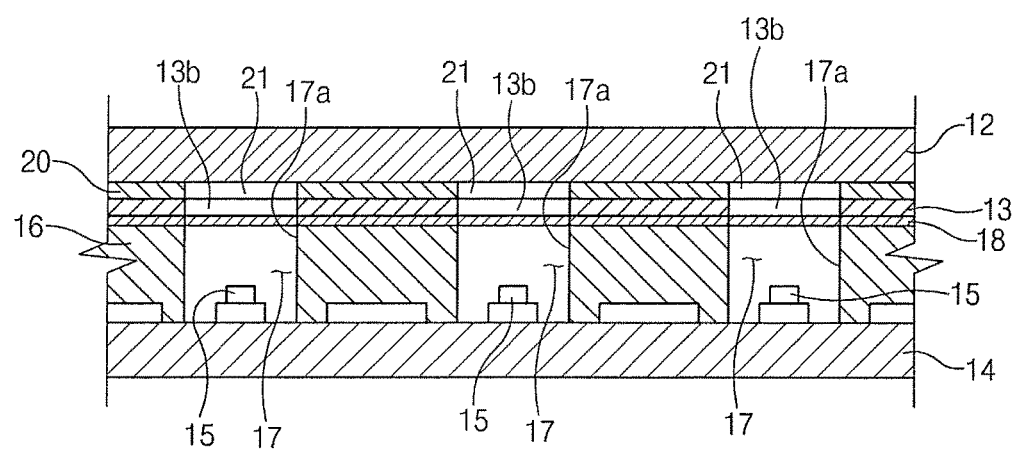
FIG. 5 is a sectional view illustrating the internal structure of the input device, according to an exemplary embodiment of the present invention.

As illustrated in FIG. 2 and FIG. 3, the electronic lock 100 may include the input device 10 and a locking mechanism 50 electrically connected to the input device 10.

As illustrated in FIG. 1, the input device 10 may be disposed adjacent to a door 2 of the receiving box 1. The input device 10 may be configured to perform touch authentication or wireless authentication.

As illustrated in FIG. 1, the locking mechanism 50 may be disposed inside the receiving box 1 and may be formed in a deadbolt structure, a latch structure, or the like. The locking mechanism 50 may perform an unlocking operation wherein the door 2 of the receiving box 1 is opened. The unlocking operation of the locking mechanism 50 may be performed through the touch authentication or the wireless authentication of the input device 10.

Referring to FIG. 2 to FIG. 8, according to an exemplary embodiment of the present invention, the input device 10 may include a body 11, a touch pad 12 disposed in the body 11, a touch detector 13 disposed at a back side of the touch pad 12, a printed circuit board (PCB) 14 connected to the touch detector 13, and a plurality of light emitting devices 15 disposed on the printed circuit board 14.

The body 11 may be formed in the shape of an opened frame having front and back portions. The touch pad 12 may be mounted on the front portion of the body 11. A protector 19 may be mounted on the back portion of the body 11. The protector 19 may be coupled to the back portion of the body 11 by fasteners 19a.

The touch pad 12 may be formed of a transmissive material which transmits light of the light emitting device 15. The touch pad 12 may be provided in a black color wherein a user does not view the internal part of the touch pad 12 with the naked eyes of the user when the light emitting device 15 is turned off A plurality of input elements 21 may be provided on a back surface of the touch pad 12 through a printing manner or by use of a film 20.

According to an exemplary embodiment of the present invention, the input elements 21 may be formed on the film 20 through the printing manner or a depositing manner. The film 20 may be attached to the back surface of the touch pad 12.

For example, the film 20 having the input elements 21 may be attached to the back surface of the touch pad 12 using an adhesive.

Alternatively, the film 20 having the input elements 21 may be formed integrally with the back surface of the touch pad 12 through an insert-molding manner.

At least two mutually-different symbols including numbers or characters, may be displayed on each input element 21 while the symbols are overlapping with each other. As the light of the light emitting device 15 is selectively transmitted through the input elements 21, the symbols may be selectively displayed.

According to another exemplary embodiment of the present invention, the input elements 21 may be directly printed on the back surface of the touch pad 12. In the present case, the film 20 may be omitted.

Figure 7:
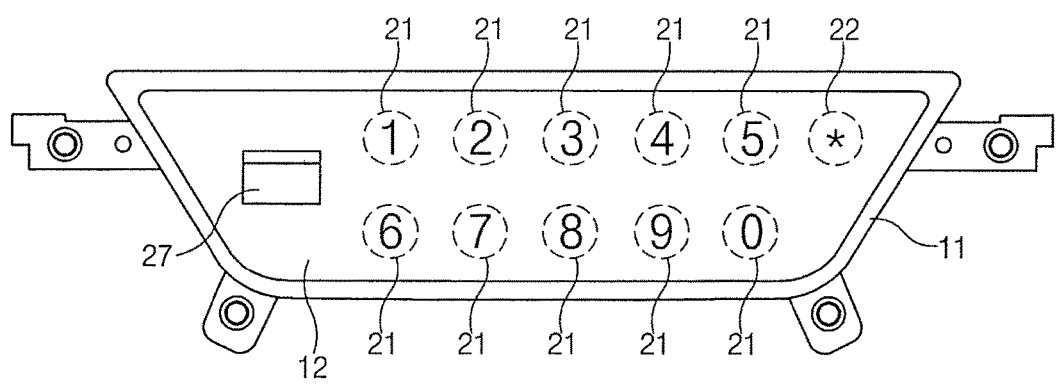
FIG. 7 is a view illustrating positions of the symbols on the input device, according to an exemplary embodiment of the present invention.
Figure 8:
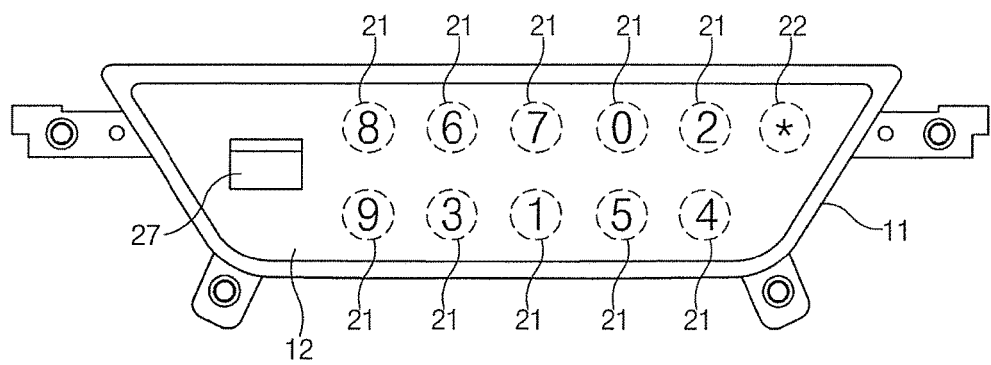
FIG. 8 is a view illustrating the positions of the symbols illustrated in FIG. 7 that are varied.

In addition, a verification element 22 may be formed on the back surface of the touch pad 12 or the film 20. The verification element 22 may be used to verify that the input of a password or the recognition of an electronic tag is finished. In addition, the verification element 22 may be used to register the password or the identification information (e.g., a registration number) of the electronic tag, or may be used to perform the unlocking operation of the locking mechanism 50 without an additional authentication procedure. Although the verification element 22 has "*", or asterisk, as the symbol thereof as illustrated in FIG. 7 and FIG. 8, the verification element 22 may have various special characters as the symbol thereof.

In addition, an antenna indicia 27 may be formed on the back surface of the touch pad 12 or the film 20 to indicate the position of a radio frequency (RF) antenna 14b, which will be described later. Accordingly, when the electronic tag accesses the antenna indicia 27, the RF antenna 14b may receive the identification information of the electronic tag and transmit the identification information of the electronic to a wireless authentication module 43.

The touch detector 13 may be configured to recognize each touch to the input elements 21 and the verification element 22. A connector 13a extends from one side of the touch detector 13. The connector 13a may be electrically connected to the printed circuit board 14.

According to an embodiment, the touch detector 13 may include a capacitive detector having a plurality of electrodes 13b. Each electrode 13b may include a transparent electrode to transmit light of the light emitting device 15 which will be described later. The electrodes 13b may be independently mounted on relevant positions corresponding to the input elements 21 and the verification elements 22.

According to another exemplary embodiment, the touch detector 13 may be directly printed together with the input elements 21 on the back surface of the touch pad 12.

The light emitting devices 15 may be mounted on the printed circuit board 14 or the touch pad 12. The light emitting devices 15 may be independently mounted on relevant positions corresponding to the input elements 21 and the verification element 22.

According to an embodiment, each light emitting device 15 may have a combination structure of at least two light emitting diodes (LED) which emit light having at least two mutually different colors.

According to another exemplary embodiment, each light emitting device 15 may include three color LEDs which emit light having at least two mutually different colors.

The printed circuit board 14 may be mounted thereon with a radio frequency (RF) antenna 14b, which may recognize an electronic tag including a near field communication tag (NFC) or a radio frequency identification (RFID) tag, and an infrared detector 14c which may recognize the access of the electronic tag. The RF antenna 14b and the infrared detector 14c may be disposed at positions corresponding to the antenna indicia 27. As described above, when the access of the electronic tag is recognized by the infrared detector 14c, since the RF antenna 14b is activated, the consumption of a standby current may be minimized.

According to various exemplary embodiments, a diffusion sheet 18 may be provided on the back surfaces of the input elements 21 or the back surface of the film 20 to diffuse light of the light emitting device 15. According to another exemplary embodiment, the diffusion sheet 18 may be substituted with a lens.

A support member 16 may be interposed between the touch detector 13 and the printed circuit board 14. The support member 16 may be provided on an edge portion thereof with a snap protrusion and the like to be snap-coupled to an edge portion of the protector 19.

The support member 16 may have a plurality of receiving apertures 17 in which the light emitting devices 15 are individually received. The receiving apertures 17 may be isolated from each other by a sealing wall 17a. The receiving apertures 17 may be individually sealed by relevant sealing walls 17a. As described above, as the light emitting devices 15 may be individually received in the relevant receiving apertures 17, the light emitting devices 15 may be isolated from each other, and light from the light emitting device 15 may be prevented from interfering with light from an adjacent light emitting device 15. Accordingly, the light from each light emitting device 15 may be individually transmitted to the relevant input element 21 of the touch pad 12.

Figure 6:
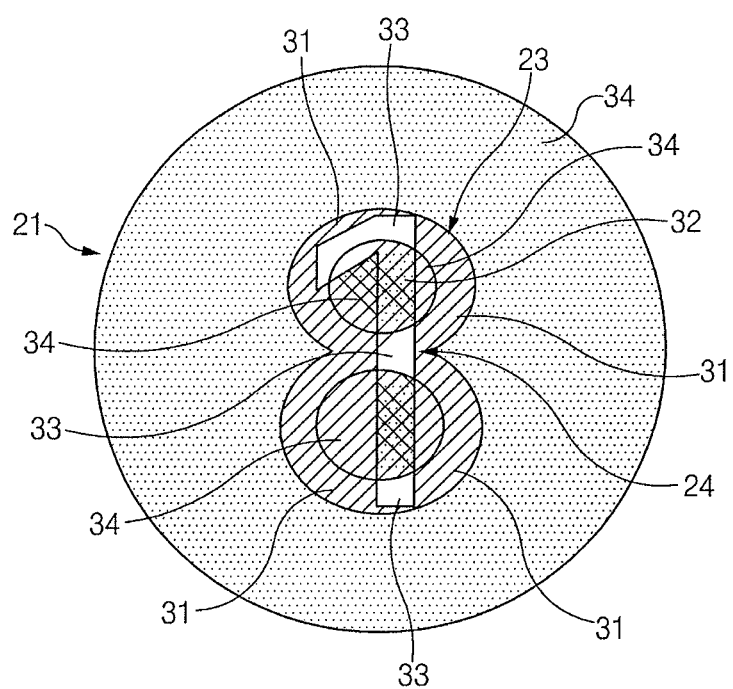
FIG. 6 is a view illustrating any one of input elements of the input device, according to an exemplary embodiment of the present invention.

The support member 16 and the printed circuit board 14 may be formed therein with groove parts 16a and 14a, respectively, through which the connector 13a of the touch detector 13 passes. Accordingly, the connector 13a of the touch detector 13 may be connected to a connector of the printed circuit board 14 after the connector 13a passes through the groove parts 16a and 14b of the support member 16 and the printed circuit board 14. Thus, a signal of the touch detector 13 may be transmitted to the printed circuit board 14.

according to an exemplary embodiment of the present invention, as illustrated in FIG. 6, each input element 21 may have at least two symbols 23 and 24 which are formed in overlap with each other and in mutually different colors.

FIG. 6 illustrates the input element 21 in which the symbol 23 having the shape of "8" and the symbol 24 having the shape of "1" are formed in overlap with each other.

A plurality of regions 31, 32, 33, and 34 of each input element 21 may be displayed in mutually different colors such that the regions 31, 32, 33, and 34 are distinguished from one another. As illustrated in FIG. 6, the regions 31, 32, 33, and 34 may include a first color region 31, which transmits light having a first color, a second color region 32, which transmits light having a second color, a third color region 33 having a white color, which transmits all wavelengths of light, and a fourth color region 34 having a black color which absorbs all wavelengths of light.

The first color region 31 is formed at a portion of the symbol 23 having the shape of "8", and the second color region 32 is formed at a portion of the symbol 24 having the shape of "1". The third color region 33 is formed at an overlap portion between the symbol 23 having the shape of "8" and the symbol 24 having the shape of "1". The fourth region 34 may be formed at a remaining portion of the input element 21 other than the symbol 23 having the shape of "8" and the symbol 24 having the shape of "1".

For example, on the assumption that the first color is a red color, and the second color is a blue color, when the input element 21 is emitted with light having the red color from the light emitting device 15, the light having the red color may be transmitted to the first color region 31 and the third color region 33. Thus, only the symbol 23 having the shape of "8" may be displayed. In addition, when the input element 21 is emitted with light having the blue color from the light emitting device 15, the light having the blue color may be transmitted to the second color region 32 and the third color region 33. Thus, only the symbol 24 having the shape of "1" may be displayed.

As described above, each input element 21 may have at least two mutually different symbols 23 and 24 which are formed in overlap with each other and in mutually different colors. Each light emitting device 15 individually emits lights having mutually different colors which correspond to the colors of the symbols 23 and 24, respectively, to selectively display any one of the symbols 23 and 24. Accordingly, mutually different symbols may be displayed on each input element 21. Therefore, positions of symbols are variably displayed on the touch pad 20, enhancing security and privacy of the touch input.

Hereinafter, the operation of the input device 10 configured according to an exemplary embodiment of the present invention will be described with reference to FIG. 7 and FIG. 8.

Since the light emitting devices 15 are turned off in a sleep mode in which there is neither user touch nor access of the electronic tag, the symbols of each input element 21 are not displayed on the touch pad 12.

In addition, when a user touches the touch pad 12, the light emitting devices 15 are turned on. When the light emitting devices 15 are turned on, a plurality of symbols may be displayed on the touch pad 12 through the input elements 21 as illustrated in FIG. 7. In FIG. 7, a plurality of numbers is sequentially displayed like the array of "1, 2, 3, 4, 5, 6, 7, 8, 9, and 0". The user inputs a password which is previously registered.

When a user causes an input error while inputting the password or when the user reenters the password, a control device 41 (see FIG. 9) detects the input error or the re-input of the password and controls the light emitting devices 15. Accordingly, different symbols may be displayed on the input elements 21, and thus a plurality of numbers may be randomly displayed like the array of "8, 6, 7, 0, 2, 9, 3, 1, 5, and 4".

A registration button 28 may be provided in the protector 19 to register the password or identification information (e.g., a registration number of a card) of the electronic tag. The registration button 28 may be provided at a position corresponding to a verification element 22. The registration button 28 may be configured to turn on or off a contact of a tact switch provided in the printed circuit board 14.

Since the registration button 28 is positioned on the back surface of the input device 10, the registration button 28 may be manipulated only in the state where the door 2 of the receiving box 1 is opened, preventing the access of a person other than the user.

Figure 9:
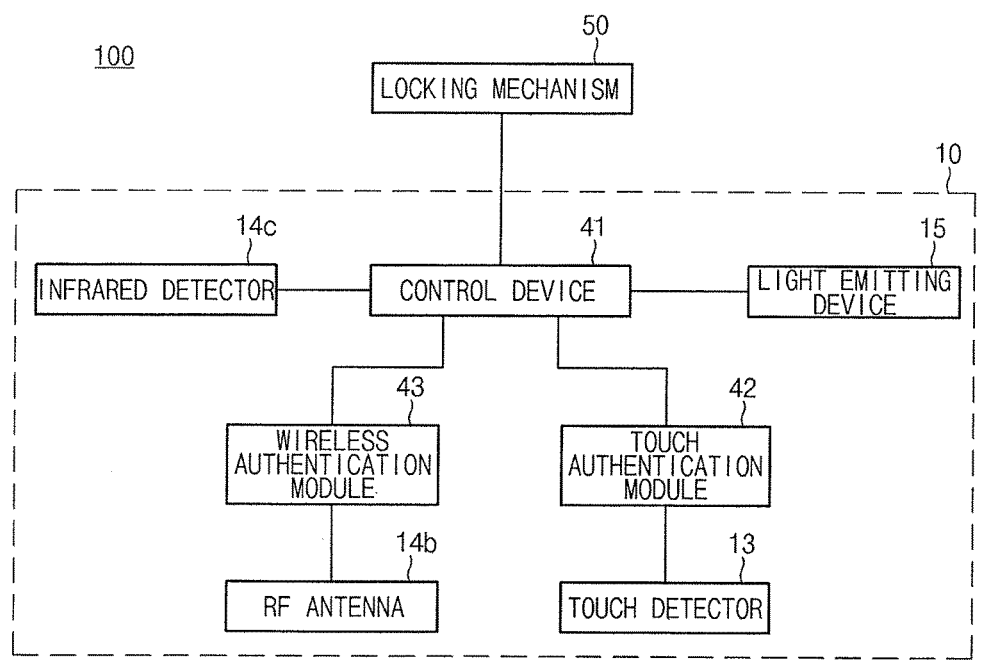
FIG. 9 is a block diagram illustrating the electronic lock, according to an exemplary embodiment of the present invention.

FIG. 9 is view illustrating a control block of the electronic lock 100, according to an exemplary embodiment of the present invention.

Referring to FIG. 9, the electronic lock 100 further includes the control device 41 which is configured to control the locking mechanism 50.

The control device 41 is connected to a touch authentication module 42 which is connected to the touch detector 13, a wireless authentication module 43 which is connected to the RF antenna 14b, the light emitting devices 15, and the infrared detector 14c.

The control device 41 may control the unlocking operation of the locking mechanism 50 based on an authentication result of the touch authentication module 42 or the wireless authentication module 43.

In addition, the control device 41 controls the light emitting devices 15 depending on whether there is a touch to the touch detector 13 or the access of a user. Accordingly, one of the symbols 23 and 24 is selectively displayed on each input element 21. Therefore, positions of symbols are varied and displayed on the touch pad 20.

When a password or a fingerprint is input through a selective touch to the input elements 21 and the verification element 22, the touch authentication module 42 may perform a comparison operation based on a password combination or fingerprint information registered in a memory of the control device 41, and may determine whether to authenticate the input password or the input fingerprint. In other words, the touch authentication module 42 may perform a mode of authenticating the password or the fingerprint.

The wireless authentication module 43 may perform a wireless authentication mode, the wireless authentication mode may be a mode in which the identification information (e.g., the registration number of the card) of the electronic tag, which is received by the RF antenna 14b, is compared with the identification information registered in the memory of the control device 41 or the wireless authentication module 43, and the identification information of the electronic tag is authenticated or unauthenticated.

Figure 10:
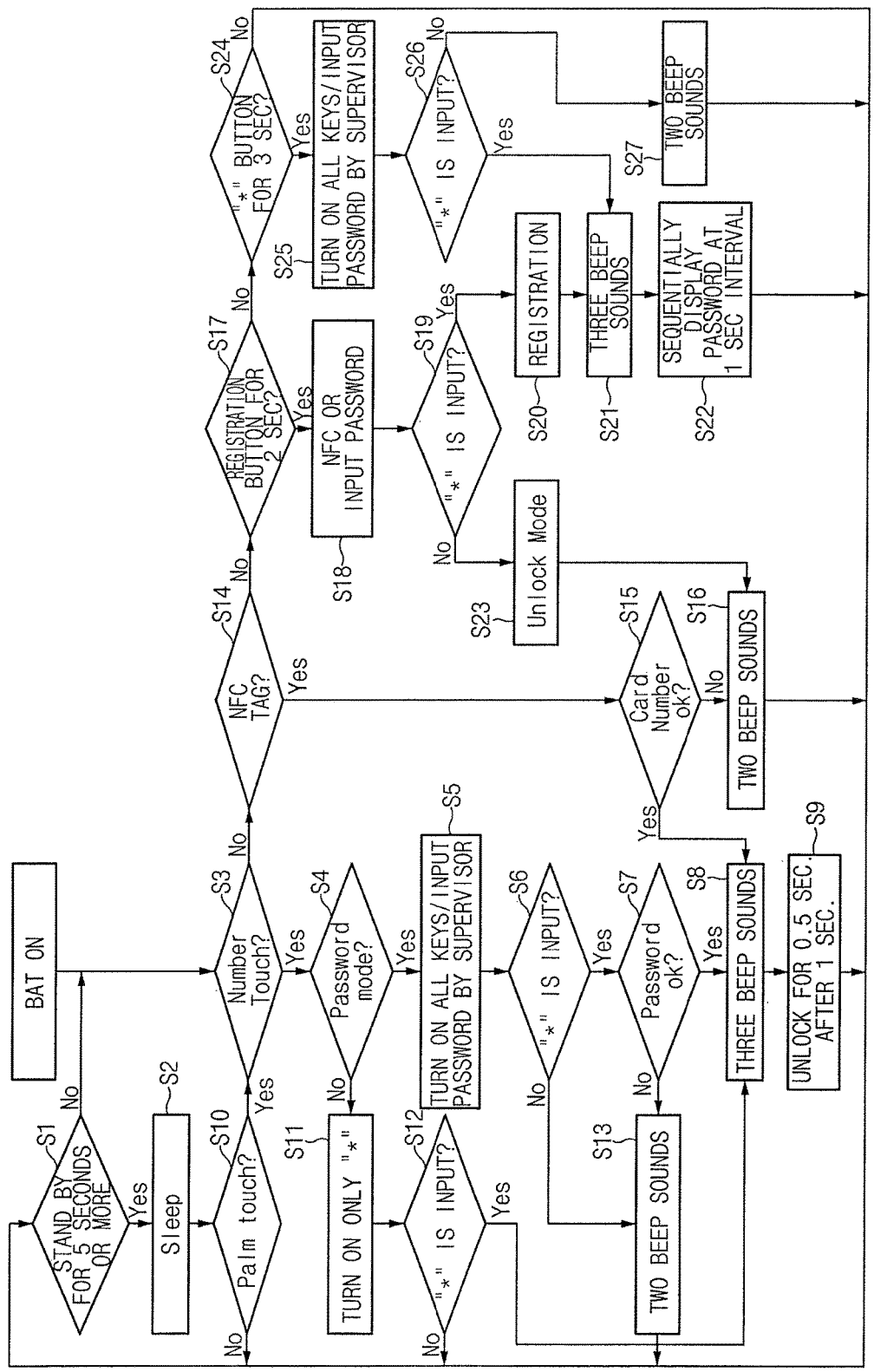
FIG. 10 is a flowchart illustrating a method for controlling the electronic lock, according to an exemplary embodiment of the present invention.

FIG. 10 is a flowchart illustrating a method for controlling the electronic lock 100, according to an exemplary embodiment of the present invention.

The control device 41 determines whether a present state is a standby state in which a touch to the touch pad 12 is not input even though a predetermined standby time (e.g., five seconds) or more elapses (S1). The control device 41 proceeds to a sleep mode, in which the light emitting devices 15 are turned off, when the present state is the standby state (S2).

After the sleep mode (S2), the control device 41 determines whether at least a portion of the touch pad 12 is touched by a user (S10). When at least a portion of the touch pad 12 is determined to be touched by the user, the control device 41 determines whether at least any one of the input elements 21 is touched (S3).

When the touch pad 12 is touched within a predetermined standby time in operation S1, the control device 41 determines whether at least any one of the input elements 21 is touched (S3).

When at least any one of the input elements 21 is determined to be touched in operation S3, the control device 41 determines whether a present mode is a password authentication mode (S4).

When the present mode is determined to be the password authentication mode in operation S4, the control device 41 turns on the light emitting devices 15 and displays all symbols of the input elements 21 and the verification element 22. Accordingly, the user selectively touches the input elements 21 and inputs a password (S5).

When the present mode is determined to not be the password authentication mode in the operation S4, the control device 41 turns on only the light emitting device 15 corresponding to the symbol of the verification element 22 to display only the symbol of the verification element 22 (S11). Thereafter, the control device 41 determines whether the verification element 22 is touched (S12).

When the verification element 22 is determined to be touched in operation S12, the control device 41 generates an authentication notification signal (e.g., three beep sounds) (S8), and performs the unlocking operation of the locking mechanism 50 for 0.5 seconds after 1 second elapses (S9).

In addition, when the verification element 22 is not determined to be touched in the operation S12, the control device 41 returns to the standby state (returns to the operation S1).

The control device 41 determines whether the verification element 22 is touched (S6) after the password is completely input through the selective touches to the input elements 21 in operation S5. When the verification element 22 is determined to be touched in operation S6, the touch authentication module 42 determines whether the input password is matched with the registered password (S7).

When the touch authentication module 42 determines that the input password is matched with the registered password in operation S7, the control device 41 generates the authentication notification signal (e.g., three beep sounds) (S8) and performs the unlocking operation of the locking mechanism 50 for 0.5 seconds after 1 second elapses (S9).

When the verification element 22 is determined to be touched in the operation S6 or when the touch authentication module 42 determines that the input password is not matched with the registered password in the operation S7, the control device 41 generates a non-authentication notification signal (e.g., two beep sounds) (S13) and returns to the standby state (returns to the operation S1).

Meanwhile, when the touch to the symbol of the input element 21 is not determined to be input in the operation S3, wireless authentication mode may be performed.

In detail, when the touch to the symbol of the input element 21 is not determined to be input in the operation S3, the control device 41 determines, using the infrared detector 14c, whether the electronic tag including an NFC tag or an RFID tag, accesses the RF antenna 14b (S14).

When the electronic tag is determined as accessing the RF antenna 14b in operation S14, the wireless authentication module 43 compares the identification information (e.g., a registration number) of the electronic tag with the registered identification information and determines whether the identification information of the electronic tag is matched with the registered identification information (S15).

When the wireless authentication module 43 determines that the identification information of the electronic tag is matched with the registered identification information in operation S15, the control device 41 generates the authentication notification signal (e.g., three beep sounds) (S8) and performs the unlocking operation of the locking mechanism 50 for 0.5 seconds after 1 second elapses (S9).

When the wireless authentication module 43 determines that the identification information of the electronic tag is not matched with the registration identification information in the operation S15, the control device 41 generates the non-authentication notification signal (e.g., two beep sounds) (S16) and returns to the standby state (returns to the operation S1).

When the electronic tag including the NFC tag or the RFID tag, is not determined as accessing the RF antenna 14b in operation S14, the control device 41 determines whether a user registration mode is performed (the user registration mode is to register the password or the identification information (e.g., the registration number of the card) in the memory of the control device 41 by a user) (S17).

In detail, when the electronic tag is not determined as accessing the RF antenna 14b, the control device 41 determines whether the registration button 28 of the input device 10 is pressed for a predetermined time (approximately 2 seconds) in the state that the door 2 of the receiving box 1 is opened, determining whether the user registration mode is performed.

When the control device 41 determines that the registration button 28 is pressed for the predetermined time by the user in operation S17, the control device 41 may perform the user registration mode, and thus the user may input the identification information of the electronic tag or the password (S18).

After the password or the identification information of the electronic tag is input by the user, the control device 41 determines whether the verification element 22 is touched (S19).

When the verification element 22 is determined to be touched in operation S19, the control device 41 performs a registration process in which the password or the identification information of the electronic tag is registered in the memory of the control device 41 (S20). In addition, after the control device 41 generates a registration notification signal (e.g., three beep sounds) (S21), the control device 41 sequentially displays the password or the identification information of the electronic tag at a predetermined time interval (e.g., one second) (S22), and then returns to the standby state (S1).

When the verification element 22 is not determined to be touched in the operation S19, the control device 41 performs an unlocking mode for unlocking the locking mechanism 50 (S23). After the unlocking mode is performed, the control device 41 generates an unlocking notification signal (e.g., two beep sounds) (S16) and returns to the standby state (S1).

Meanwhile, when the user registration mode is not determined to be performed in the operation S17, the control device 41 may determine whether to perform a supervisor registration mode for registering the password in the memory of the control device 41 by a supervisor (step S24).

In detail, when it is determined that the registration button 28 is not pressed for a predetermined time by a user in the operation S17, the control device 41 determines whether the verification element 22 is pressed by the supervisor for a predetermined time (e.g., third seconds) (S24).

When the supervisor is determined as pressing the verification element 22 for a predetermined time in operation S24, the control device 41 turns on all light emitting devices 15 and allows the supervisor to input the password (S25).

Thereafter, the control device 41 determines whether the verification element 22 is touched (S26). When the verification element 22 is touched, the control device 41 generates the registration notification signal (e.g., three beep sounds) (S21) and then sequentially displays the password or the identification information of the electronic tag (S22). Thereafter, the control device 41 returns to the standby state (returns operation S1). In addition, when the verification element 22 is not touched, the control device 41 generates a non-registration notification signal (e.g., two beep sounds) (S27) and returns the standby state (returns to the operation S1).

When the control device 41 determines that the verification element 22 is not pressed for the predetermined time in the operation S24, the control device 41 returns to the standby state (returns to the operation S1).

As described above, according to an exemplary embodiment of the present invention, the positions of the symbols of the input elements are varied, enhancing security and privacy.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An input apparatus comprising:
   a touch pad including a transmissive material;
   a touch detector disposed at a rear portion of the touch pad;
   a printed circuit board connected to the touch detector;
   a plurality of input elements disposed on a back surface of the touch detector, each input element having at least two symbols that are formed in overlap with each other and in mutually different colors; and
   a plurality of light emitting devices respectively emitting light to the input elements.

2. The input apparatus of claim 1, wherein each light emitting device emits lights having at least two different colors corresponding to the mutually different colors of the symbols of each input element.

3. The input apparatus of claim 1, wherein the input elements are formed on a film, and
   wherein the film is attached to a back surface of the touch pad.

4. The input apparatus of claim 1, wherein the input elements are printed on a back surface of the touch pad.

5. The input apparatus of claim 1, wherein the touch detector includes:
   a capacitive detector having a plurality of electrodes.

6. The input apparatus of claim 5, wherein the electrodes include transparent materials.

7. The input apparatus of claim 1, wherein the touch detector is printed integrally with the input elements on a back surface of the touch pad.

8. The input apparatus of claim 1, wherein a support member is interposed between the touch detector and the printed circuit board, and
   wherein the support member has a plurality of receiving openings in which the light emitting devices are received.

9. The input apparatus of claim 8, wherein the receiving openings are isolated from each other by a sealing wall.

* * * * *